US011953106B2

(12) United States Patent
Dehrmann et al.

(10) Patent No.: US 11,953,106 B2
(45) Date of Patent: Apr. 9, 2024

(54) APPARATUS FOR HANDLING FLUID OF AN AT LEAST PARTIALLY ELECTRICALLY DRIVEN VEHICLE

(71) Applicant: ECO Holding 1 GmbH, Marktheidenfeld (DE)

(72) Inventors: Sven Dehrmann, Wörth (DE); Manuel Alt, Stuttgart (DE)

(73) Assignee: ECO Holding 1 Gmbh, Marktheidenfeld (DE)

( * ) Notice: Subject to any disclaimer, the term of this patent is extended or adjusted under 35 U.S.C. 154(b) by 0 days.

(21) Appl. No.: 17/656,537

(22) Filed: Mar. 25, 2022

(65) Prior Publication Data

US 2022/0307616 A1   Sep. 29, 2022

(30) Foreign Application Priority Data

Mar. 26, 2021   (DE) .................... 10 2021 107 710.9
May 6, 2021    (DE) .................... 10 2021 111 839.5

(51) Int. Cl.
  *F16K 11/085*   (2006.01)
  *F16K 11/087*   (2006.01)
  (Continued)

(52) U.S. Cl.
  CPC ...... *F16K 11/0853* (2013.01); *F16K 11/0873* (2013.01); *F16K 27/065* (2013.01);
  (Continued)

(58) Field of Classification Search
  CPC ............. F16K 11/0853; F16K 11/0873; F16K 27/065; F16K 31/535; F16K 11/087; F16K 27/067; F16K 31/043
  See application file for complete search history.

(56) References Cited

U.S. PATENT DOCUMENTS 3,646,963 A * 3/1972 Klee .................... F15B 13/0896
                                                137/884
3,760,844 A * 9/1973 Olson ................... F15B 13/081
                                                137/833
(Continued)

FOREIGN PATENT DOCUMENTS

DE    10 2015 214 569 A1    2/2017
DE    11 2016 002 546 T5    3/2018
DE    11 2017 000 236 T5    8/2018

OTHER PUBLICATIONS

Office Action issued in German patent application 10 2021 111 839.5, dated Jan. 13, 2022.

*Primary Examiner* — Matthew W Jellett
*Assistant Examiner* — Christopher D Ballman
(74) *Attorney, Agent, or Firm* — Timur Slonim, ESQ.; KELLER SCHNEIDER PATENT—UND MARKENANWALTE

(57) ABSTRACT

This disclosure sets out an apparatus for handling fluid, such as coolant, for a vehicle that is at least partially powered by electricity. The apparatus includes a substantially plate-shaped base element defining a base plane separating a first subspace from a second subspace. At least a first fluid flow channel section is also present and is largely located in the first subspace. At least one second fluid flow channel section is also present and is largely located in the second subspace. The base element includes at least one first flow-through opening fluidly connecting the first fluid flow channel section and the second fluid flow channel section. A method of manufacturing the apparatus is also disclosed. The method includes the steps of providing the base element with at least a first fluid flow channel section and a first flow-through opening.

13 Claims, 16 Drawing Sheets

(51) Int. Cl.
    *F16K 27/06*     (2006.01)
    *F16K 31/53*     (2006.01)
    *F16K 31/04*     (2006.01)

(52) U.S. Cl.
    CPC .......... *F16K 31/535* (2013.01); *F16K 11/087* (2013.01); *F16K 27/067* (2013.01); *F16K 31/043* (2013.01)

(56) References Cited

U.S. PATENT DOCUMENTS

| | | | |
|---|---|---|---|
| 5,183,569 A * | 2/1993 | Kyriacou | C12M 33/14 |
| | | | 210/651 |
| 9,216,388 B2 * | 12/2015 | Hogstedt | B01D 63/082 |
| 9,746,078 B2 * | 8/2017 | Egloff | F16H 61/0009 |
| 10,315,548 B2 * | 6/2019 | Kerler | B60N 2/665 |
| 2002/0134716 A1 * | 9/2002 | Maartens | B01D 61/12 |
| | | | 210/97 |
| 2002/0139741 A1 * | 10/2002 | Kopf, III | B01D 63/081 |
| | | | 210/231 |
| 2004/0108479 A1 * | 6/2004 | Garnier | F16K 99/0015 |
| | | | 251/129.01 |
| 2008/0216898 A1 * | 9/2008 | Grant | F04B 43/0733 |
| | | | 137/154 |
| 2009/0250021 A1 * | 10/2009 | Zarrabi | F02M 51/0614 |
| | | | 123/90.11 |
| 2010/0258207 A1 * | 10/2010 | Schnur | F15B 13/0839 |
| | | | 29/592 |
| 2018/0180070 A1 * | 6/2018 | Uesugi | B33Y 70/00 |
| 2019/0017590 A1 * | 1/2019 | Kidokoro | F16H 61/0006 |

* cited by examiner

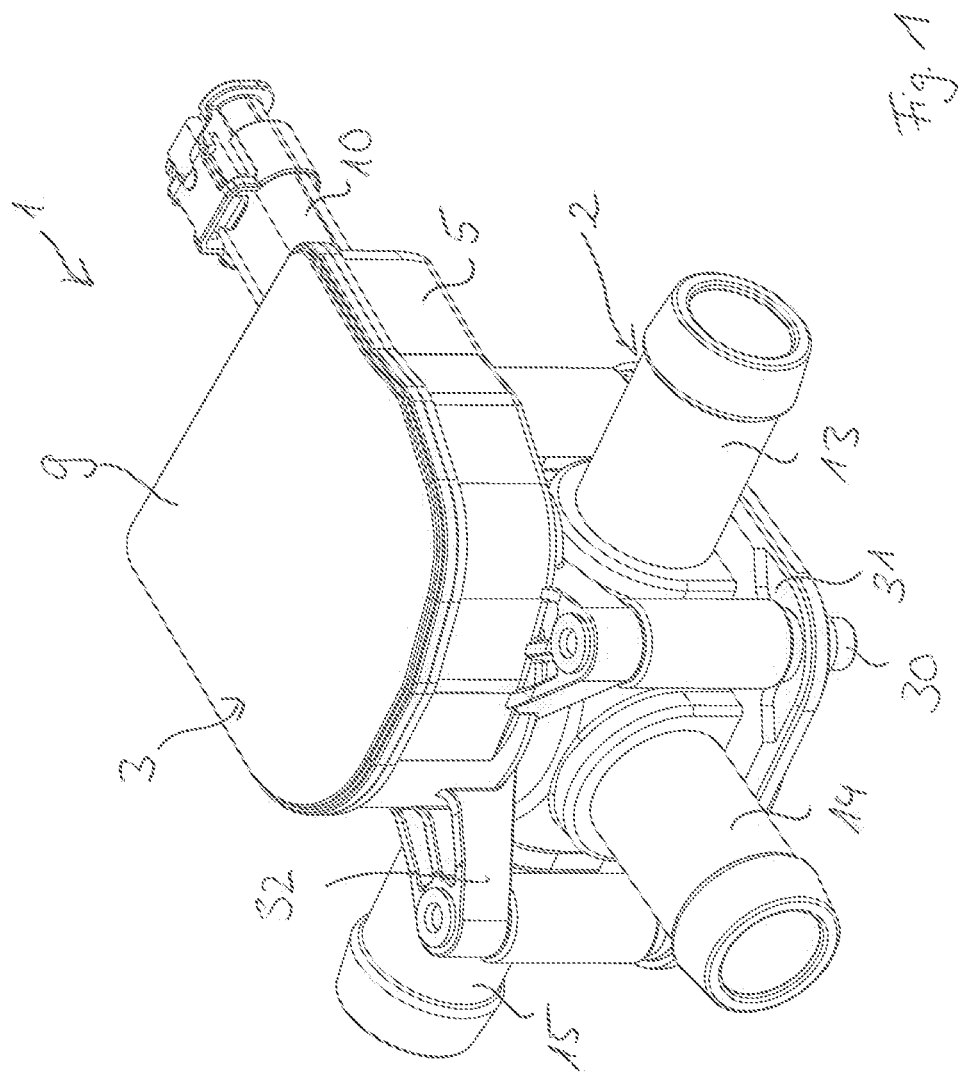

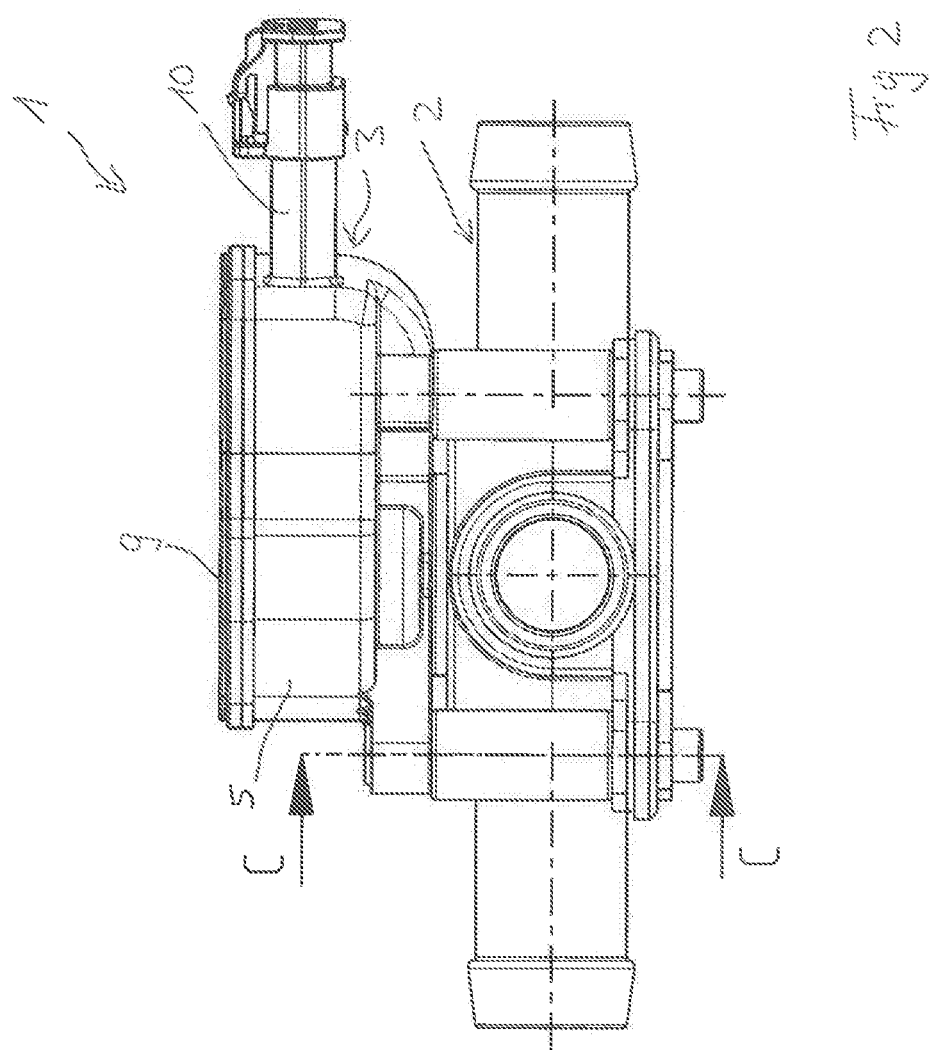

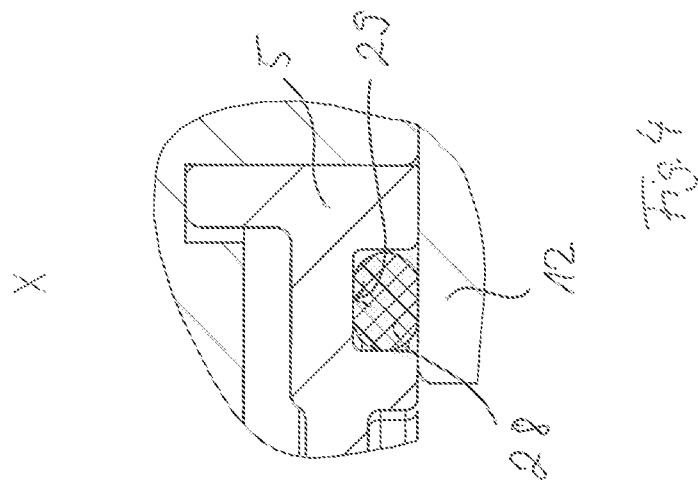
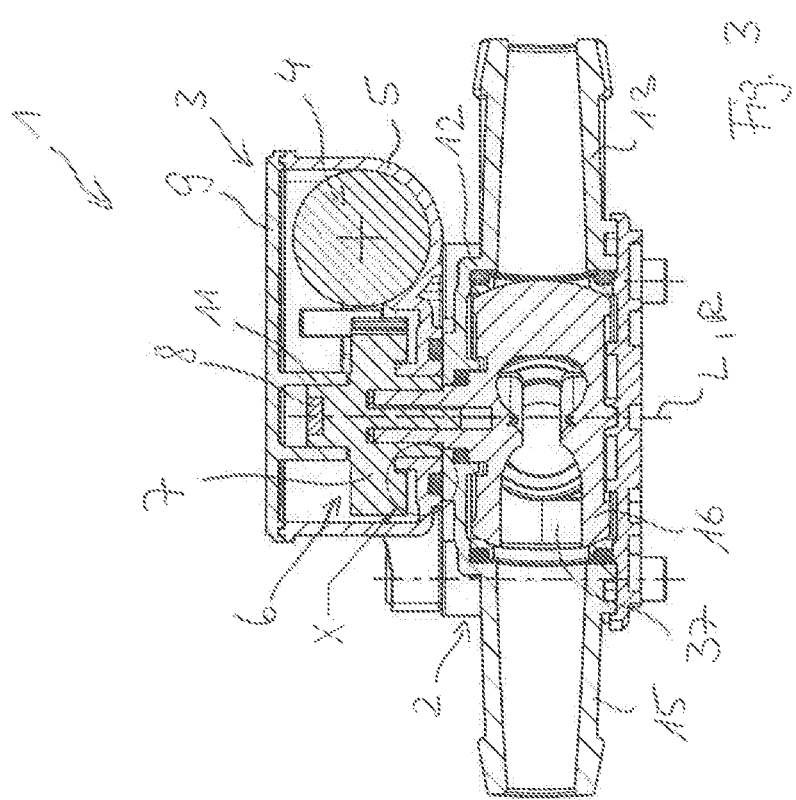

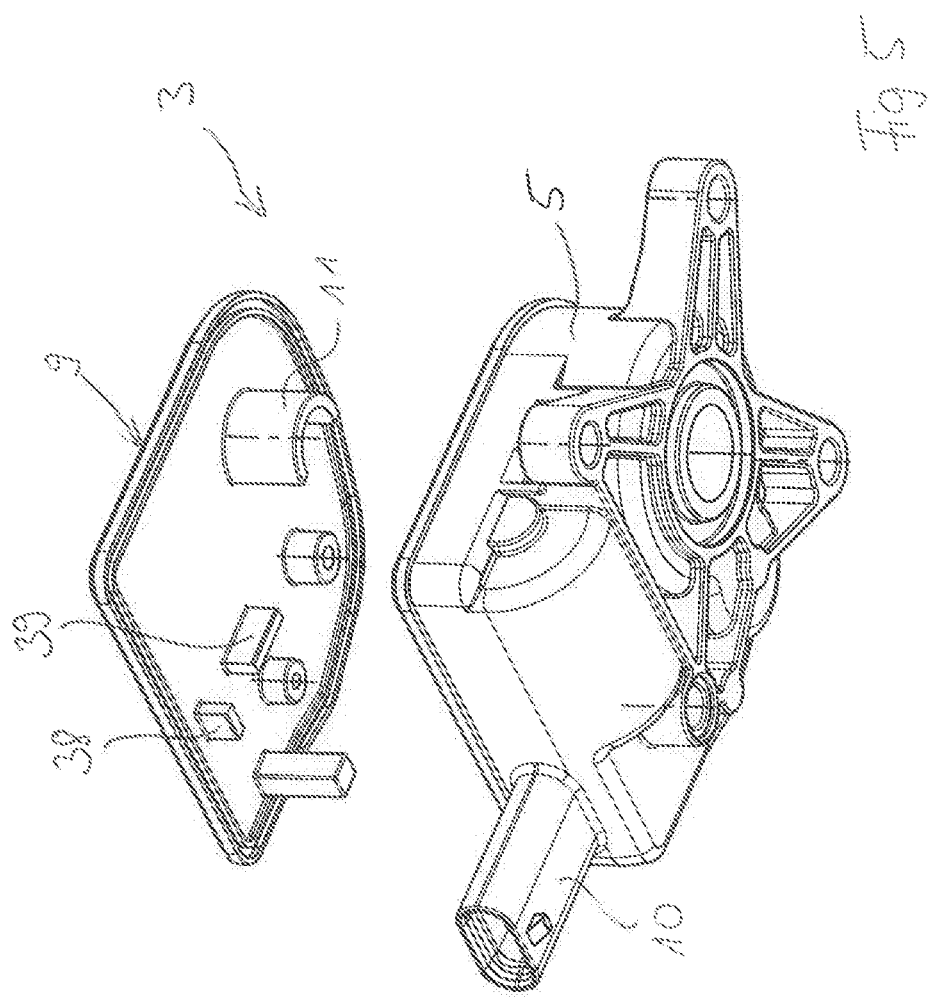

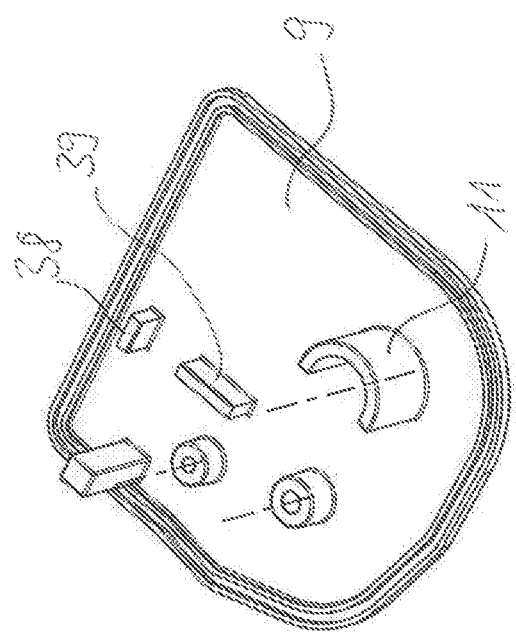

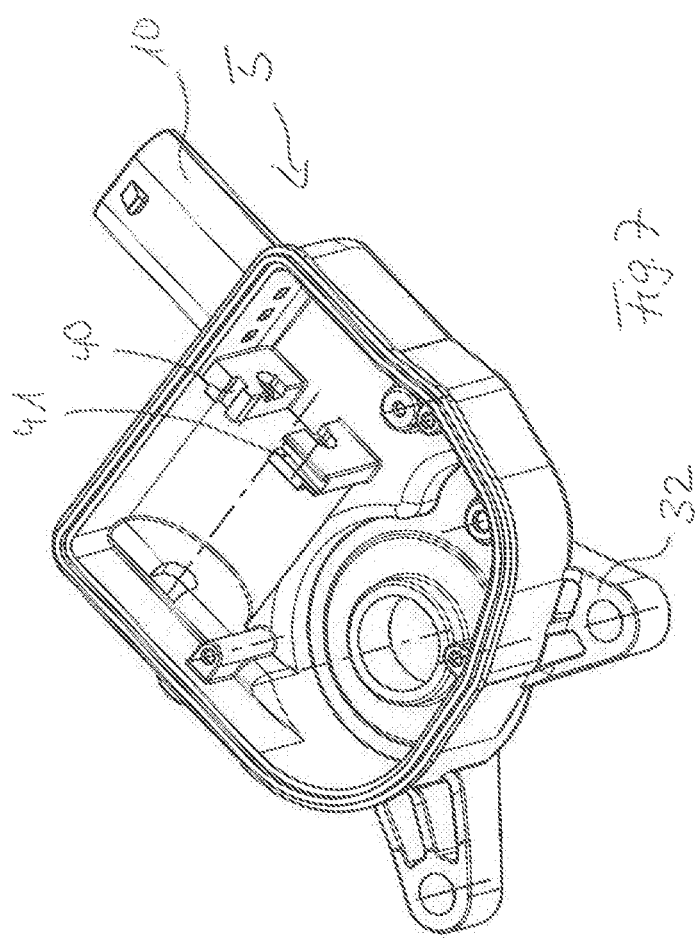

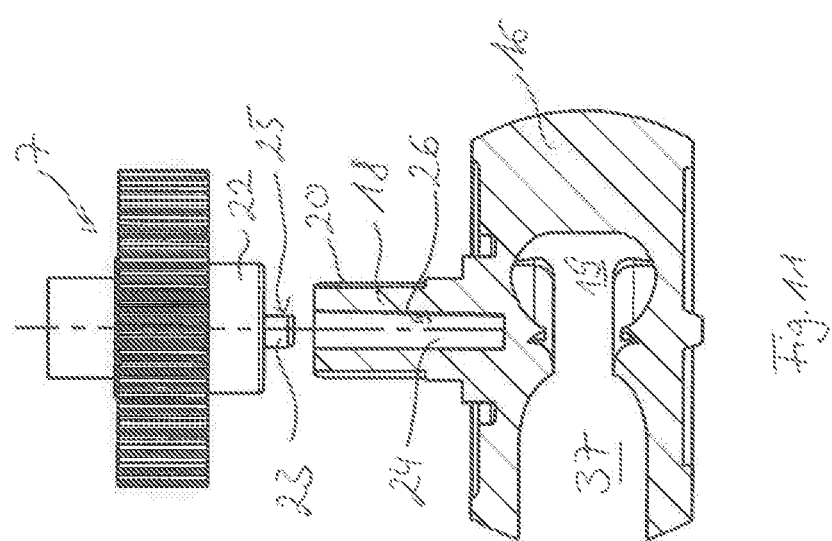
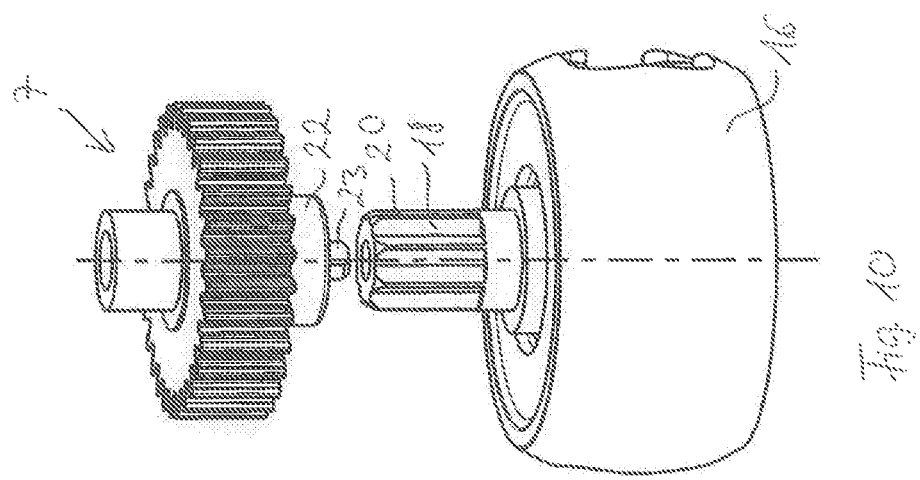

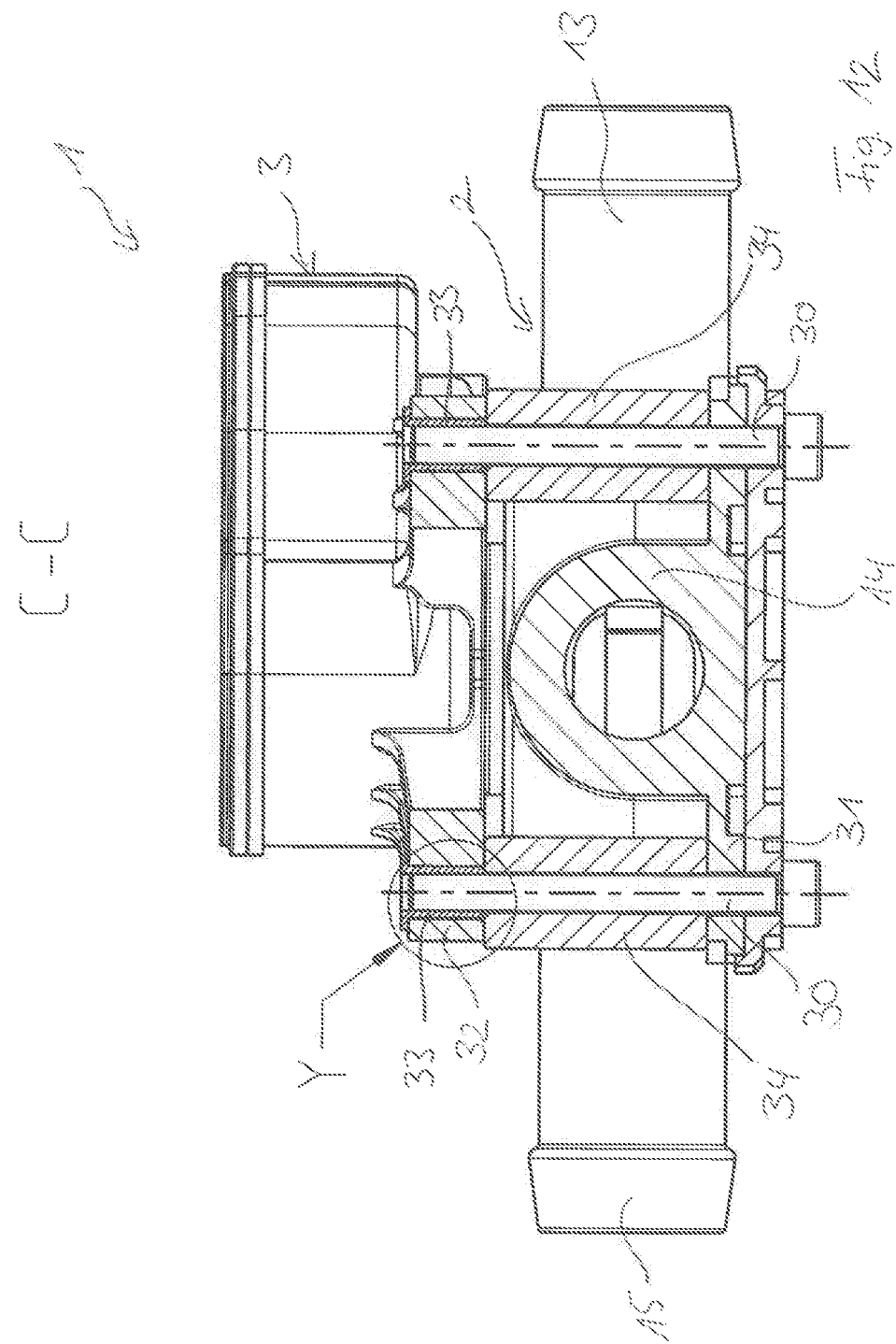

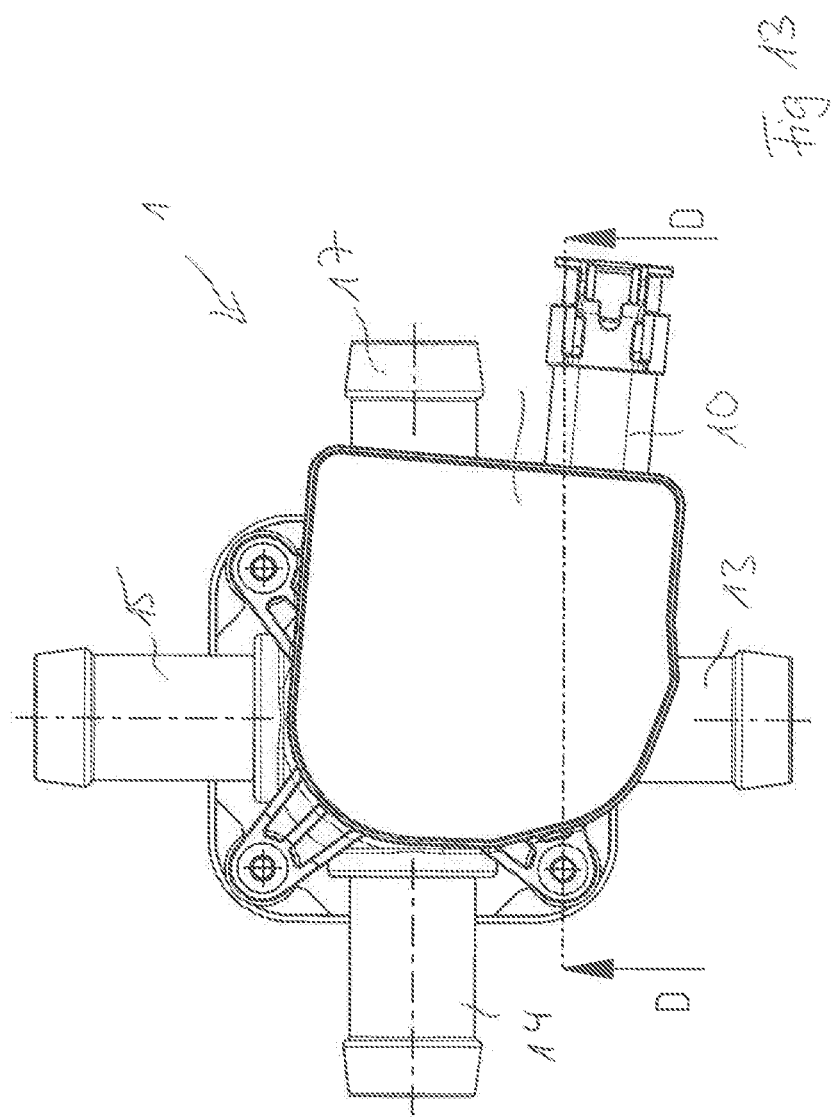

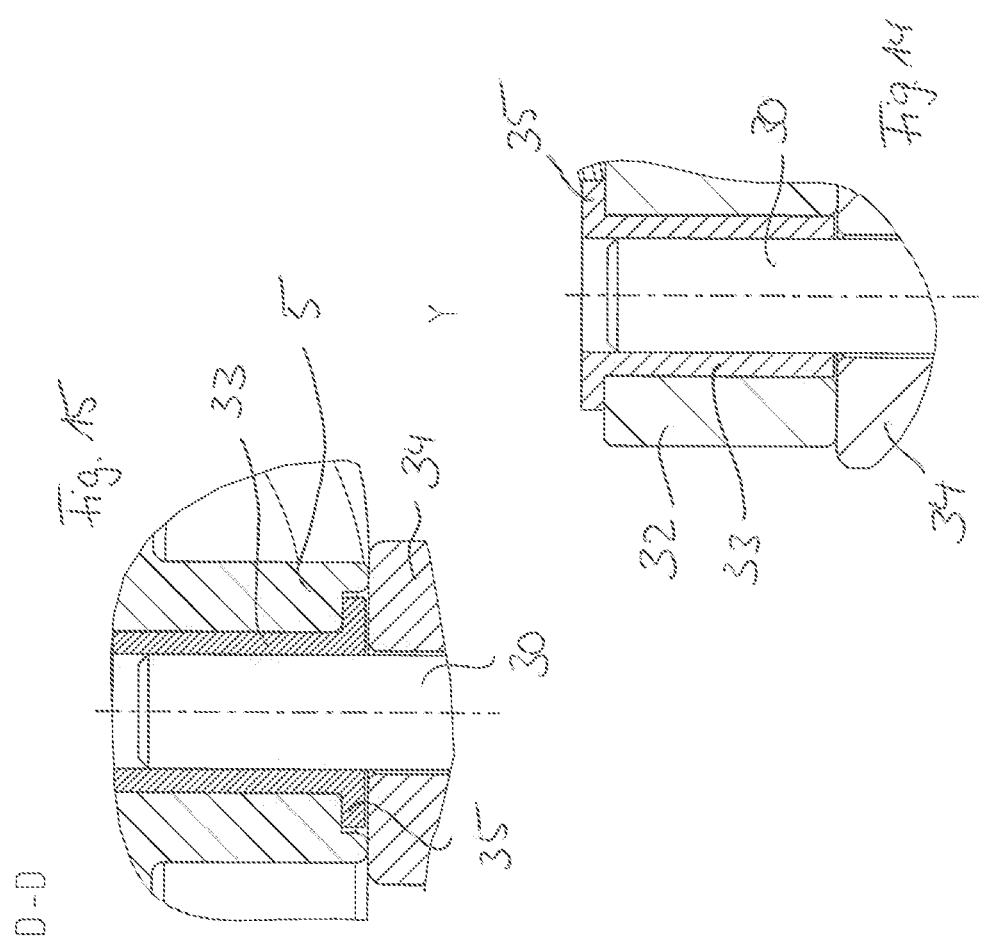

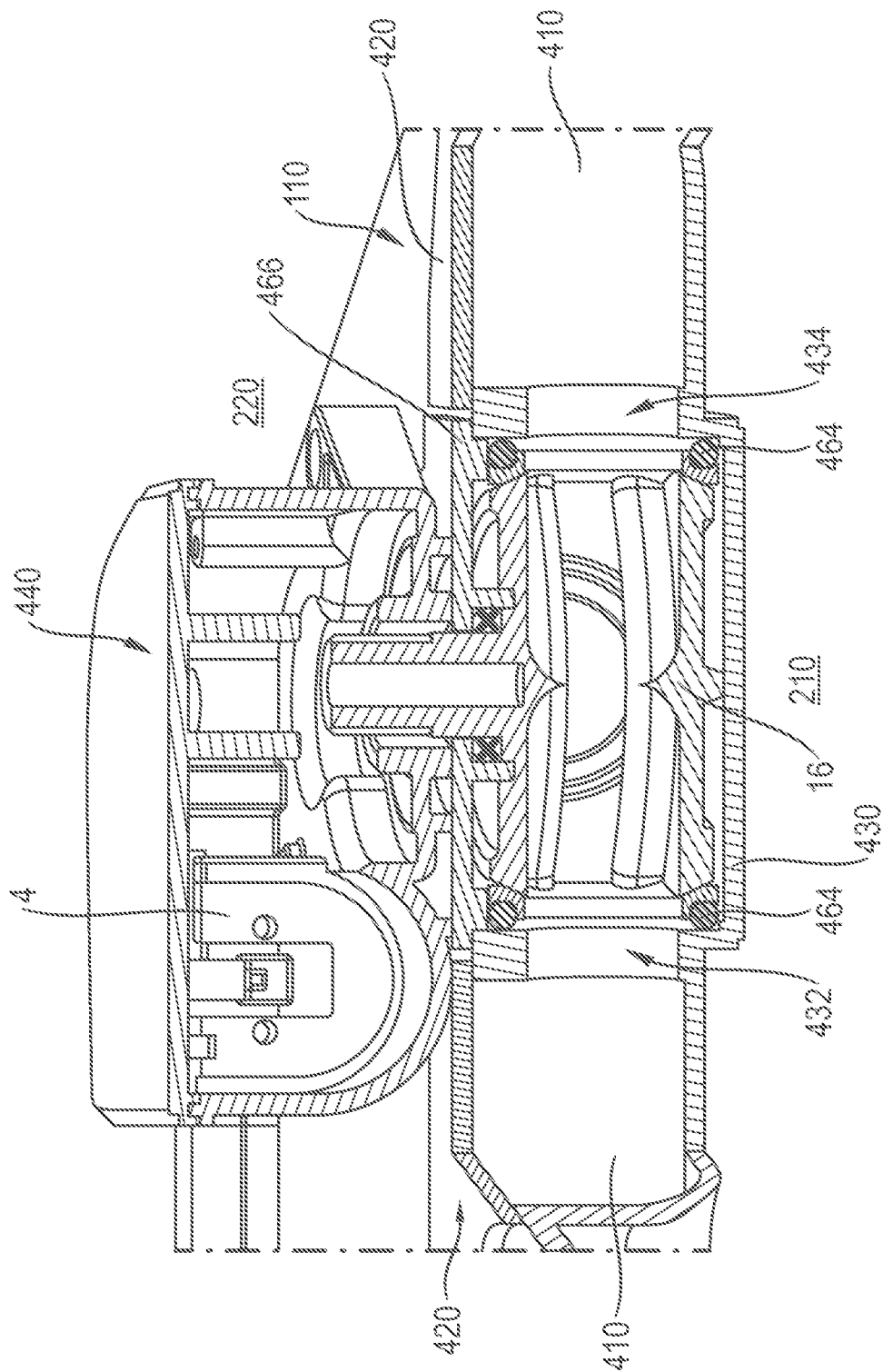

APPARATUS FOR HANDLING FLUID OF AN AT LEAST PARTIALLY ELECTRICALLY DRIVEN VEHICLE

BACKGROUND

The invention relates to an apparatus for handling fluid of an at least partially electrically driven vehicle, comprising a substantially plate-shaped base element defining a base plane, the base plane separating a first subspace from a second subspace, at least one first fluid flow channel section located mostly in the first subspace, and at least one second fluid flow channel section located mostly in the second subspace, the base element comprising at least one first through-flow opening fluidly connecting the first fluid flow channel section with the second fluid flow channel section.

Further, the invention relates to a method of manufacturing an apparatus comprising the steps of providing the base element having at least a first fluid flow channel section and a first through-flow opening, and disposing the second fluid flow channel section in the second subspace to the base element, thereby fluidically connecting the first fluid flow channel section to the second fluid flow channel section.

STATE OF THE ART

Numerous apparatuses for handling fluids in electrically powered vehicles are known in the prior art. Such fluid apparatuses are used, for example, to switch or redirect cooling fluids within so-called thermal management modules of electrically powered vehicles.

In most cases, the fluid apparatuses consist of numerous components and are therefore extremely complex in design and therefore very cost intensive.

SUMMARY OF THE INVENTION

It is an object of the present invention to provide a fluid apparatus belonging to the technical field mentioned at the beginning, which at least partially overcomes the disadvantages known in the prior art. Furthermore, it is an object of the present invention to provide a simple and inexpensive method for manufacturing a fluid apparatus.

The solution of the object is defined by the features of claim 1. The invention comprises an apparatus for handling fluid of an at least partially electrically driven vehicle. The apparatus comprises a substantially plate-shaped base element defining a base plane, the base plane separating a first subspace from a second subspace. Additionally, the apparatus comprises at least a first fluid flow channel section located mostly in the first subspace and at least a second fluid flow channel section located mostly in the second subspace. The base element comprises at least one first through-flow opening fluidly connecting the first fluid flow channel section to the second fluid flow channel section.

This achieves, for example, the technical advantage that the apparatus comprises very few components and is thus very easy to manufacture. Regardless of the number of fluid flow channels, only one plate-shaped base element is required. The base element has the necessary strength to support all components. Another advantage is that the fluid flow channels can change subspace as required. In other words, the fluid flow channels can remain constantly below the plate-shaped base element in the first subspace as required, or can be directed between the top side, second subspace, and the bottom side, first subspace, of the plate-shaped base element. For example, the center of gravity of the apparatus may also play a decisive role in the operation of the vehicle as a result. This is particularly relevant when the apparatus carries multiple flow channels. For example, the apparatus comprises more than three flow channels, in particular the apparatus comprises more than five flow channels, in particular the apparatus comprises more than nine flow channels.

Unlike the base element, which describes a concrete plate-like body, the base plane defines a geometric location. Ideally, the base plane and the base body are arranged parallel to each other. However, the plate-shaped base element may also deviate from the ideal plate shape and be spatially deformed, whereby the base plane represents a symmetry plane of the base element lying in the base element.

A fluid flow channel section is understood to be a component or section of a flow channel. Here, the fluid flow channel section may represent a partially opened section of a flow channel.

A fluid flow channel section that is mostly located in the first subspace or in the second subspace comprises a fluid flow cross-section that is mostly located below, in the first subspace, or above, in the second subspace, the base plane. Here, mostly means that at least 70% or more of the fluid flow cross-section of a fluid flow channel section is located below, in the first subspace, or above, in the second subspace, of the base plane.

A preferred embodiment comprises a third fluid flow channel section, which is largely located in the first subspace, wherein the base element comprises a second through-flow opening, which fluidically connects the second fluid flow channel section with the third fluid flow channel section. This achieves, for example, the technical advantage that a flow channel can be defined very flexibly. For example, spatial conditions or restrictions can be considered in that the flow channels can run several times from the first subspace into the second subspace and back.

According to another embodiment, the apparatus includes a third fluid flow channel section disposed exclusively in the first subspace and allowing fluid flow directed away from the base element. For example, the fluid flow pointing away from the base element is substantially orthogonal to the base plane. This provides, for example, the technical advantage that a flow-optimized inflow into a nozzle of a coolant connection above or below the base element can be achieved. The flow optimization reduces pressure differences and improves the function of the apparatus.

To enable a continuous fluid flow, a first flow channel is formed by the first fluid flow channel section, the second fluid flow channel section and the third fluid flow channel section. This achieves, for example, the technical advantage that several different fluid flow sections together form one flow channel. The flow channel is flexibly composed by the fluid flow channel sections, and the complete flow channel can extend multiple times from the first subspace to the second subspace and back.

According to a particularly preferred embodiment, the apparatus comprises a second flow channel comprising at least a fourth fluid flow channel section arranged between the first through-flow opening and the second through-flow opening and mostly in the first subspace, wherein the first flow channel and the second flow channel cross each other. This provides, for example, the technical advantage that two flow channels can be crossed, giving the apparatus additional flexibility. Thus, there is no need to define long bypass channels to connect two ports. Crossing two flow channels thus enables an even more compact design of the apparatus, resulting in less material, less weight and reduced manufacturing costs.

According to an additional embodiment, the apparatus comprises at least one further flow channel, which is mostly arranged either in the first subspace or in the second subspace. This achieves, for example, the technical advantage that particularly simple standard flow channels can be realized without changing the subspace.

In order to make a flow through the flow channels possible, the at least one further flow channel is configured to be closed by means of a closure element, whereby the closure element is arranged essentially parallel to the base element. For example, one closure element can be configured to simultaneously cover several flow channels. Here, a flow channel closure can be associated with each flow channel, wherein multiple flow channel closures are part of a common closure element. Preferably, the closure element is arranged on the base element by means of laser welding. For example, the closure element is curved, which allows the center of gravity of the apparatus to be approximated to the base plane during operation.

According to a further embodiment, the base element comprises at least one receptacle for a fluid handling element. This provides, for example, the technical advantage that the fluid handling elements required for the function and operation of the apparatus can be directly assigned to the corresponding flow channels.

Fluid flow handling elements are devices for operating and handling the fluid within the apparatus such as rotary vane assemblies, pumps or valves. However, the fluid flow handling elements are not limited to them.

According to a particularly advantageous embodiment, the receptacle comprises at least a first flow opening and a second flow opening, each connecting one of the flow channels to another of the flow channels. This provides, for example, the technical advantage that the specific flow openings for connecting the fluid handling device to the flow channels are predetermined. For example, the receptacle may comprise more than two flow openings. For example, the receptacle may comprise three or four or even more flow openings.

In order to be able to absorb the loads that occur, the base element comprises at least one bearing element for arranging the apparatus on the body of a vehicle. The loads are caused, for example, by the self-weight of the apparatus, the fluid flowing through the apparatus during operation or vehicle-specific forces.

According to a further embodiment, the base element comprises at least one fluid port for fluid to flow into the apparatus. Preferably, the fluid port is formed as an integral part of the base element.

According to another particularly preferred embodiment, the base element, including the first fluid flow channel section and the third fluid flow channel section, is formed as a one-piece integral component manufactured by injection molding. This achieves, for example, the technical advantage that the apparatus is very easy to manufacture. The injection molding process permits inexpensive and reproducible quality, whereby very few additional components and assembly steps are required to manufacture the apparatus.

According to a further embodiment, the second fluid flow channel section is arranged in the second subspace to the base element. This achieves, for example, the technical advantage that the flow channel can be closed with the aid of the second fluid flow channel section instead of a closure element. Thus, on the one hand, the flow channel is closed and, on the other hand, the flow channel changes from the first subspace to the second subspace. Preferably, the second fluid flow channel section is arranged on the base element by means of laser welding. An additional advantage here is that only one additional component needs to be arranged on the base element, which keeps the total number of components low and production particularly simple.

According to a particular embodiment, the plate-shaped base element comprises a material thickness between 1 mm and 10 mm, in particular between 2 mm and 5 mm, in particular between 2.5 mm and 3.5 mm. This achieves, for example, the technical advantage that the base plate can absorb loads occurring during operation of the apparatus, such as the self-weight of the apparatus or fluid flowing through the apparatus. A material thickness of the base plate of about 3 mm is particularly advantageous.

To make manufacturing particularly efficient, the closure element comprises a material thickness of between 0.5 mm and 3 mm, in particular between 1 mm and 2 mm. In particular, a material thickness of the closure element between 1 mm and 2 mm is advantageous due to the arrangement by means of laser welding. For example, those fluid flow channel sections which are arranged on the base element in the first or in the second subspace can each comprise a material thickness between 1 mm and 2 mm. This means that all fluid flow channel sections can be laser welded to the base element particularly well.

To further simplify the manufacture of the apparatus, a glass fiber content of the base element is greater than a glass fiber content of the closure element. For example, the glass fiber content of the base element is about 30% and the glass fiber content of the closure element or the fluid flow channel sections to be added is about 10%-15%. In particular, this provides the technical advantage of optimizing the laser weldability of the closure element or the fluid flow channel sections to be added to the base element.

For example, both the base plate and the closure elements and fluid flow channel sections to be added comprise polyphenylene ether PPE. PPE is a high temperature resistant thermoplastic that also comprises high hydrolysis resistance, good water/glycol compatibility, low water absorption and positive laser weldability. An additional advantage arises due to its low density, as bearing loads can be reduced, especially in fluid handling elements, for example in the form of pumps, and thus the service life of the apparatus can be increased.

According to a further preferred embodiment, the base element and the third fluid flow channel section are formed as a one-piece integral component manufactured by injection molding. According to an additional preferred embodiment, the first fluid flow channel section and the third fluid flow channel section are arranged in the first subspace on the base element.

According to a further embodiment, the solution to the problem is defined by the features of claim 17. The invention comprises a method of manufacturing an apparatus according to any of the preceding embodiments. The method comprises the steps of providing the base element with at least a first fluid flow channel section and a first through-flow opening, and arranging the second fluid flow channel section in the second subspace to the base element and thereby fluidically connecting the first fluid flow channel section with the second fluid flow channel section.

The advantages of this embodiment are similar to those of claim 1. In particular, for example, the technical advantage is achieved that the apparatus comprises particularly few components and can thus be manufactured very simply and in a few steps. This is possible regardless of the number of fluid flow channels, since only one plate-shaped base element is required. Despite the few steps required to manufacture it, the base element has the necessary strength to support all the components, and the fluid flow channels can change subspace as required. In other words, the fluid flow channels can remain constantly below the plate-shaped base element in the first subspace, or can be routed between the top, second subspace, and the bottom, first subspace, of the plate-shaped base element, as required.

According to a particularly preferred embodiment, the base element is provided by injection molding. Injection molding processes are inexpensive and enable reproducible quality, while requiring very few additional components and assembly steps to manufacture the apparatus.

According to a particularly preferred embodiment, the second fluid flow channel section is arranged in the second subspace on the base element by means of laser welding. This has the technical advantage, for example, that the arrangement is particularly easy. Laser welding does not cause any material damage due to high temperature effects on the components to be joined.

Correspondingly advantageously, according to a further advantageous embodiment, the first fluid flow channel section is closed by means of a closure element, wherein the arrangement of the closure element on the base element is performed by means of laser welding. The advantages are comparable to the preceding embodiment.

A further variant relates to a fluid apparatus for a fluid system of an at least partially electrically operated motor vehicle comprising a fluid valve and an actuator connected to the fluid valve for actuating the fluid valve. The actuator thereby comprises an electric motor with a motor output shaft and a gear for transmitting a torque of the motor output shaft to an actuator output gear designed for actuating the fluid valve, wherein the fluid valve comprises at least three connection openings for the inflow and/or outflow of fluid and a valve body rotatable about an axial axis of rotation with a connecting channel of arcuate design for connecting two connection openings. Further, the actuator output gear and a drive shaft of the valve body are form-fittingly connected. The fluid apparatus can be manufactured in a particularly compact and cost-effective manner.

According to an advantageous variant of the fluid apparatus, the valve body is arranged in a manifold plate, wherein the connection openings and continuing channels are provided integrally in the manifold plate. In this case, the fluid valve is closed by means of a cover which is connected to the distributor plate by a material and/or form fit. The connection openings and the continuing channels can be incorporated directly into the distributor plate and closed by means of a fluid channel cover which is also connected to the distributor plate by a material and/or form fit. This variant is particularly space-optimized and the components can be reduced by fully integrating the fluid valve into the distributor plate. Since the fluid valve is located on the channel level, fewer pressure losses due to fewer deflections are the result.

In an alternative embodiment, the fluid valve comprises a valve housing having at least three port openings for fluid to flow in and/or out, and the valve body is disposed within the valve housing. From the following detailed description and the entirety of the patent claims, further advantageous variants and combinations of features result.

Further advantageous embodiments and combinations of features result from the following detailed description and the entirety of the patent claims.

BRIEF DESCRIPTION OF THE DRAWINGS

The drawings used to explain the embodiment show:
FIG. 1 a perspective view of a fluid apparatus comprising an actuator and a fluid valve;
FIG. 2 a side view of the fluid apparatus according to FIG. 1;
FIG. 3 a longitudinal section of the fluid apparatus according to FIG. 1;
FIG. 4 an enlarged partial view X of FIG. 3;
FIG. 5 an exploded view of an actuator of the fluid apparatus according to FIG. 1;
FIG. 6 a perspective view of an actuator cover of the actuator according to FIG. 5;
FIG. 7 a perspective view of an actuator housing of the actuator according to FIG. 5;
FIG. 10 an exploded view of the valve body and actuator output gear;
FIG. 11 a side view of the valve body and actuator output gear, with the valve body cut away;
FIG. 12 a further, partially cut side view of the fluid apparatus according to FIG. 2;
FIG. 13 a top view of the fluid apparatus according to FIG. 2;
FIG. 14 an enlarged section Y of the fluid apparatus according to FIG. 12;
FIG. 15 an enlarged section D-D of the fluid apparatus according to FIG. 13;
FIG. 20 a still further sectional view of an apparatus according to the invention.

Basically, same parts are provided with same reference signs in the figures.

WAYS TO CARRY OUT THE INVENTION

Figure 8:
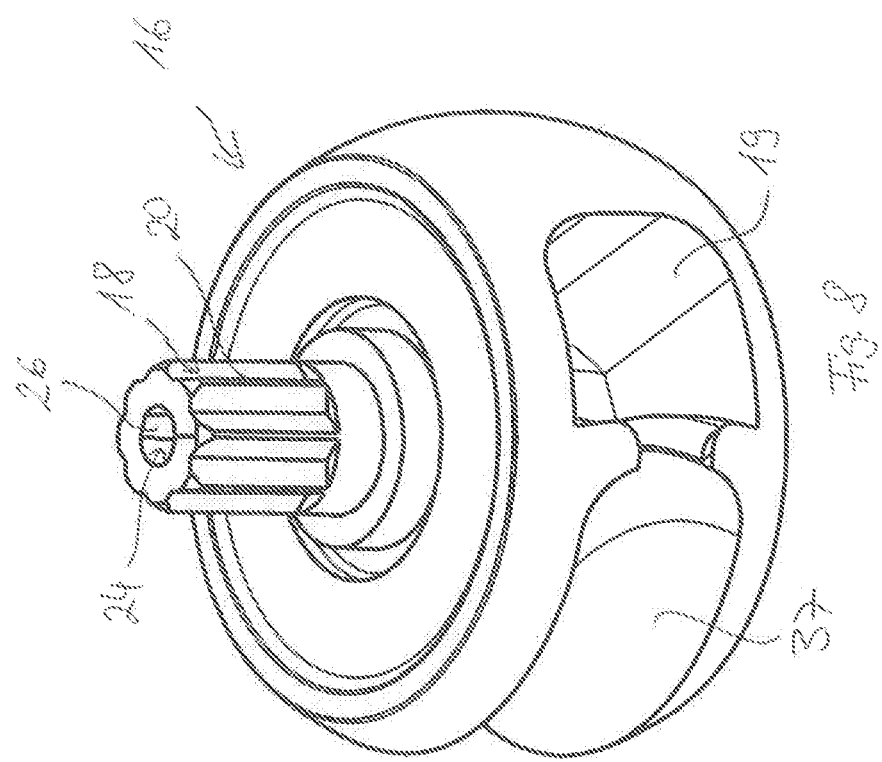
FIG. 8 a perspective view of a valve body of the fluid valve of the fluid apparatus according to FIG. 1.
Figure 9:
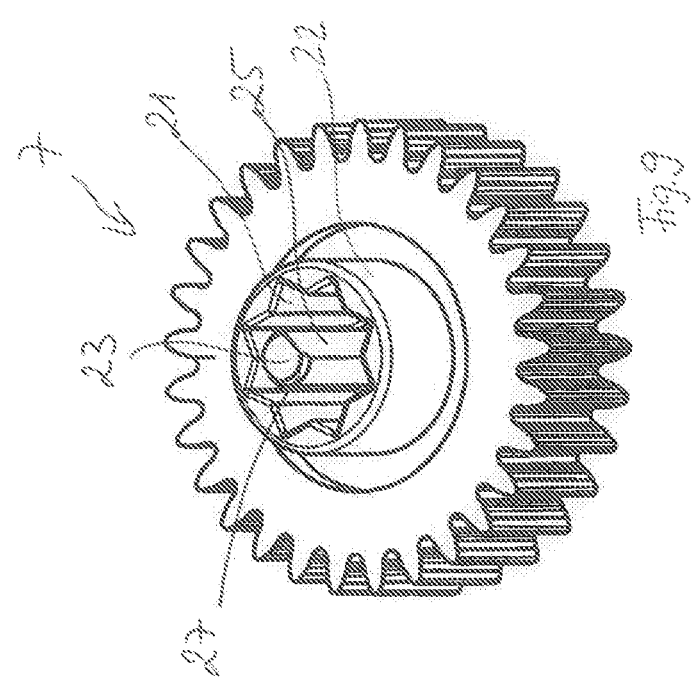
FIG. 9 a perspective view of an actuator output gear of the actuator.

FIG. 1 shows a perspective view of a drive device 1, which comprises at least one fluid valve 2 and an actuator 3 connected to the fluid valve 2 for actuating the fluid valve 2 and which is provided for a fluid system of an at least partially electrically operated motor vehicle.

The actuator 3 has an electric motor 4 schematically indicated in FIG. 3 in the form of a brushless stepper motor. The electric motor 4 lies flat in a fluidically sealed actuator housing 5 and is arranged in a space-saving manner next to a gearbox 6 for transmitting a torque of a motor output shaft not shown to an actuator output gear 7. The motor output shaft is connected to the gearbox 6, for example, by means of a gearbox input shaft in the form of a worm drive.

The actuator output gear 7 is preferably oriented orthogonally to the motor output shaft, allowing a particularly flat design of the actuator 3.

A magnet 8 is arranged centrally at one end region of the actuator output gear 7 in order to detect a rotational position of the magnet 8 and thus of the actuator output gear 7 with the aid of a sensor unit not shown. The sensor unit is axially spaced from the front end of the actuator output gear 7 to enable precise measurement. For this purpose, the sensor unit is arranged directly above the end area of the actuator output gear 7 on the magnet 8.

In addition to the gearbox input shaft and the actuator output gear 7, the gearbox 6 preferably has two further gearwheels whose gearwheel axes are oriented parallel to the axis of the actuator output gear 7. The motor output shaft is connected to a third gearwheel by means of the gearbox input shaft. The torque of the electric motor 4 is transmitted via the worm drive to the third gearwheel, whose third gearwheel axis is orthogonal to the motor output shaft 112.

On the side of the actuator housing 5, which is connected to an actuator cover 9, there is a plug connector 10, which comprises an interface (not shown) for connecting to an external control unit.

Above the gearbox 6 there is a control unit in the form of a printed circuit board, which is not shown and which carries the sensor unit exactly above the magnet 8. A recess in the control unit offers a spatially optimized and compact design, since the control unit and the electric motor 4 can be arranged closer to each other and the distance between the control unit and the front end of the gears can be additionally reduced.

The actuator cover 9 comprises a housing-side bearing 11 for holding the actuator output gear 7. The housing-side bearing 11 is formed as a tongue or as a wall of a partial cylinder. The tongue-shaped design of the housing-side bearing 11 accommodates an asymmetrical bearing load during operation of two gears in mesh with each other. The asymmetrical bearing load is caused by the fact that two gears in mesh with each other comprise the property of generating forces pointing radially away from each other during operation. The tongue-shaped design of the bearing is only used on the side that is subjected to the load. This means that the actuator output gear 7 is only supported on one side, which makes it easier to assemble the actuator 3.

The control unit is arranged between the end face of the actuator output gear 7 and the actuator cover 9. To enable the housing-side bearing 11 to hold the actuator output gear 7, it is guided through a contour of the control unit.

The fluid valve 2, which is also referred to as a rotary slide valve and which can be seen in particular in the longitudinal section of the fluid apparatus 1 shown in FIG. 3, comprises a valve housing 12 with at least three, in particular four, connection openings 13, 14, 15, 17 for the inflow and/or outflow of fluid and a valve body 16, which is arranged inside the valve housing 12 and can be rotated about an axial axis of rotation R, with at least one connecting channel 17 of arcuate design for connecting two connection openings. The connection openings 13, 14, 15, 17 are arranged radially, although other designs with an axially provided connection opening are conceivable.

Auxiliary inlets 19 are provided in addition to the connecting channel 37 adjacent to the inlet and/or outlet of the connecting channel 37 and serve to avoid pressure losses and allow constant volume flows.

The valve body 16 is spherical in shape and comprises a drive shaft 18 provided in one piece with the valve body 16. The drive shaft 18 engages with the actuator output gear 7 to drive the valve body 16 and is form fitted connected to it after assembly.

The drive shaft 18 comprises a star-shaped outer toothing 20 on its outer side, which engages a corresponding star-shaped inner toothing 21 of the actuator output gear 7 for torque transmission. The internal teeth 21 are formed in a cylindrical protrusion 22, wherein a raised medium shaft 23 is provided within the internal teeth 21 and projects beyond one end face of the protrusion 22.

In order to mount the actuator output gear 7 and the valve body 16 in a defined angular position relative to each other, the medium shaft 23 and a bore 24 comprise corresponding mirror surfaces 25, 26. This ensures that an assembly offset by one tooth can be ruled out according to the Poka Yoke principle.

An end chamfer 27 on the medium shaft 23 allows concentric alignment in the internal spline 21.

As can be seen from FIGS. 3 and 4, a static seal 28, in particular an annular seal, is further provided for sealing between the actuator housing 5 and the valve housing 12. The static seal 28 is arranged in a circumferential groove 29 of the actuator housing 5 and bears sealingly against the valve housing 12 after assembly. Compared to known rotary shaft seals, the static seal enables a lower torque loss due to friction on parts moving relative to each other and is also cost-effective.

FIG. 12 shows, for example, that the fluid valve 2 is connected to the actuator 3 by means of a screw connection. For this purpose, screw means 30 are provided which, starting from the valve housing 12, extend through the valve housing 12 or valve housing connection sections 31 and the actuator housing 5 or actuator connection sections 32 and engage threaded inserts 33 inserted into the actuator housing 5. In each case, a screw pre-tensioning force is absorbed by a pressure limiter 34, which is supported on a screw head support and the threaded insert 33.

The threaded inserts 33 each comprise a collar 35, which additionally provides a form fit and prevents the threaded insert 33 from being pulled out of the actuator housing 5.

FIG. 15 shows an enlarged section D-D through FIG. 13. It can be seen that this threaded insert 33, in contrast to the other threaded inserts 33, is inserted into the actuator housing 5 from below, i.e. from the direction of the fluid valve 2. This is due to the fact that the screw area is not located in the portion of the connecting sections 31, 32, but in a portion between the actuator housing 5 and the valve housing 12. This ensures the sealing of the fluid apparatus 1. The threaded insert 33 is longitudinally slotted and spreads when the screw means 30 is tightened and, in combination with a knurled outer diameter, jams in the actuator housing 5 in such a way that it also supports the torque during tightening and thus does not have to be counterheld for this purpose.

Furthermore, the actuator cover 9 and the actuator housing 5 comprise alignment geometries in order to achieve a form fit positioning of the actuator cover 9 on the actuator housing 9 such that two degrees of freedom are locked. As can be seen from FIG. 5 and FIG. 6, an inner side of the actuator cover 9 comprises two male alignment geometries 38, 39 arranged at an angle of 90° to each other. These engage with the female alignment geometries 40, 41 of the valve housing 12 when mounted in the valve housing 12. Thus, two degrees of freedom are locked. A third degree of freedom is subsequently achieved by appropriate welding or bonding (frictional connection) of the two housing parts 5, 9 to each other.

Another variant, not shown, provides for the valve body to be arranged directly in a distributor plate, with the connection openings and continuing channels being provided integrated in the distributor plate. In this case, the fluid valve is closed by means of a cover which is connected to the distributor plate by a material and/or form fit.

The connection openings and the continuing channels can be incorporated directly into the distributor plate and closed by means of a fluid channel cover that is also connected to the distributor plate by a material and/or form fit.

It is possible to provide channel crossings in a simple manner. For example, one channel can be provided directly integrated in the distributor plate. A second channel crossing the first channel can be formed in the fluid channel cover.

Likewise, a temperature sensor can be integrated into the fluid channel cover.

This design is particularly optimized in terms of installation space, and the full integration of the fluid valve in the distributor plate means that the components can be reduced. Since the fluid valve is located on the channel level, fewer pressure losses are the result due to fewer deflections.

Figure 16:
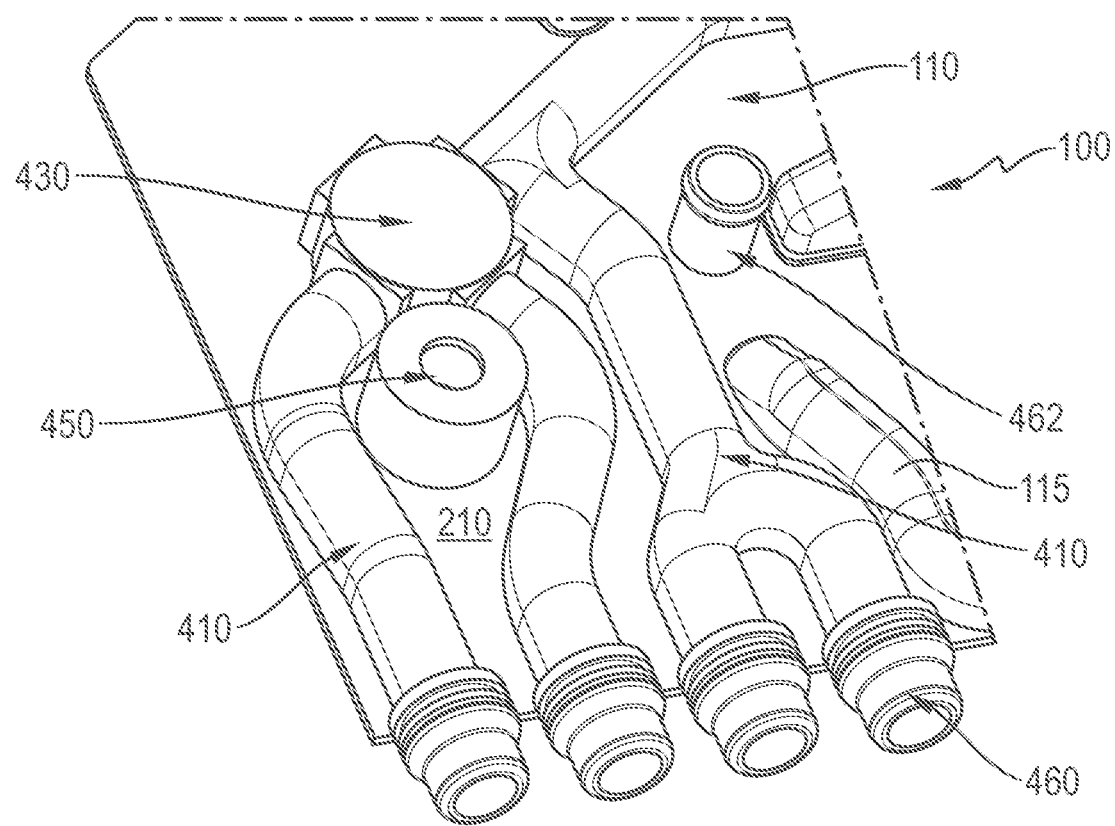
FIG. 16 a perspective view of a base element.

FIG. 16 shows a perspective view of a base element 110 as viewed from the side of the first subspace 210. The base element 110 is planar in shape and is an integral part of the apparatus 100 for handling fluid of an electrically powered vehicle. The base element 110 defines a base plane, which forms a separation of a here upper first subspace 210 and a here lower second subspace 220.

A fluid flow channel section 115 and further flow channels 410 are arranged in the first subspace 210, each of which is connected to a fluid port 460 for the inflow of fluid into the apparatus 100. The fluid flow channel section 115 and the further flow channels 410 are mostly located in the first subspace 210, i.e. here above the base element 110. The base element 110 has a nozzle 462 which allows fluid to flow out of the apparatus 100. In addition, the base element 110 comprises a bearing element 450 for connecting the base element 110 to the body of a vehicle.

Some flow channels 410 are connected to a receptacle 430 for fluid handling elements 440 (not shown), which are used to operate the apparatus 100 or control the fluid in the apparatus 100. The fluid handling elements 440 (not shown) are inserted into the receptacles 430 from the second subspace 220

Figure 17:
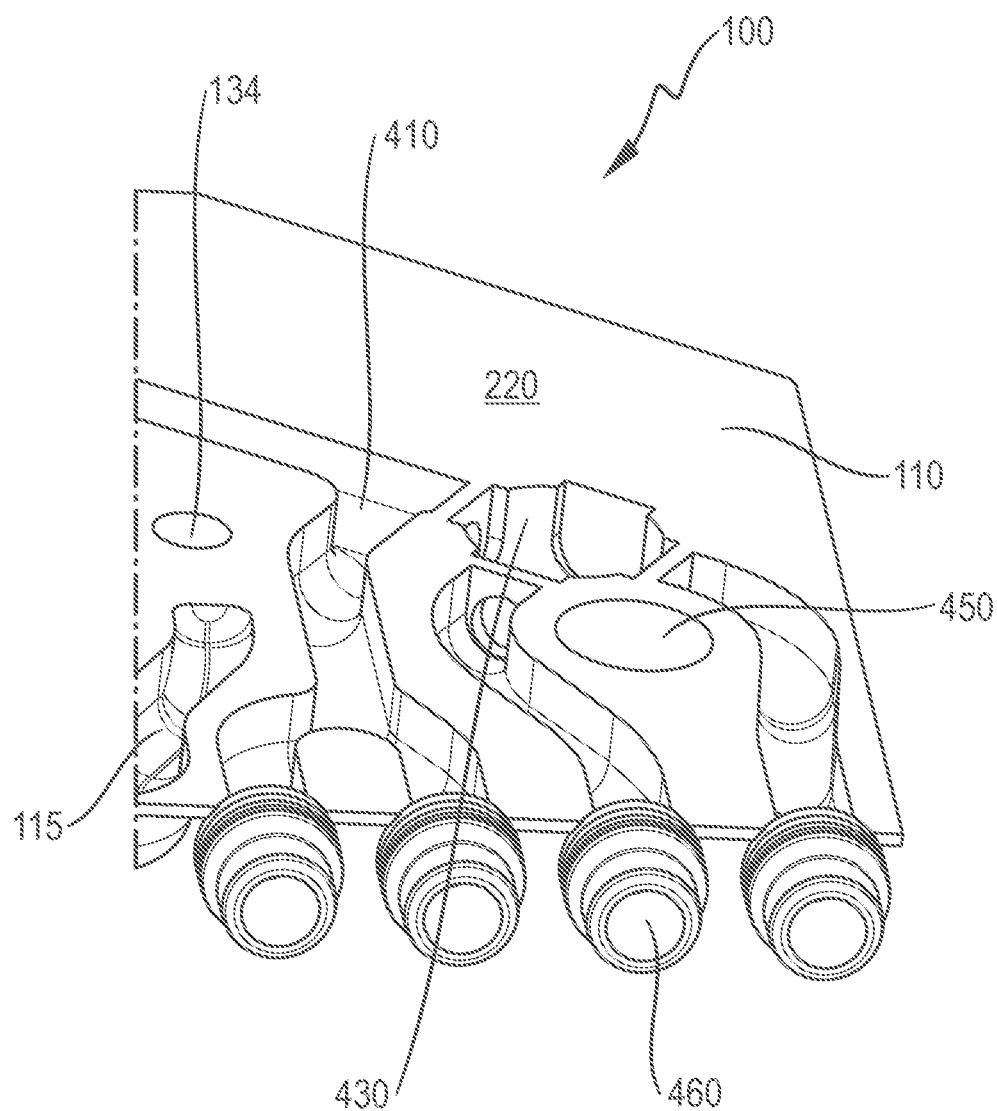
FIG. 17 a further perspective view of a base element.

FIG. 17 shows a further perspective view of a base element 110 from the side of the second subspace 220. The fluid flow channel section 115 already described above and the further flow channels 410, which are mostly located in the first subspace 210, are open to the second subspace 220. In a subsequent manufacturing step, they are connected to fluid flow channel sections 125 in the second subspace 220 (not shown) or closed by means of closure elements 420 (not shown) to form complete flow channels.

The further flow channels 410 shown here are arranged exclusively in the first subspace 210 and are not intended to be transferred from the first subspace 210 to the second subspace 220. In other words, fluid flows into the apparatus 100 in the further flow channels 410 in the first subspace 210 and flows out of the first subspace 210 of the apparatus 100 without flowing through a through-flow opening.

The receptacles 430 for inserting fluid handling elements 440 comprise flow openings 432, 434 for connecting flow channels 300, 400, 410. Here, fluid flows can be controlled depending on the particular fluid handling element 440 inserted into a receptacle 430.

Figure 18:
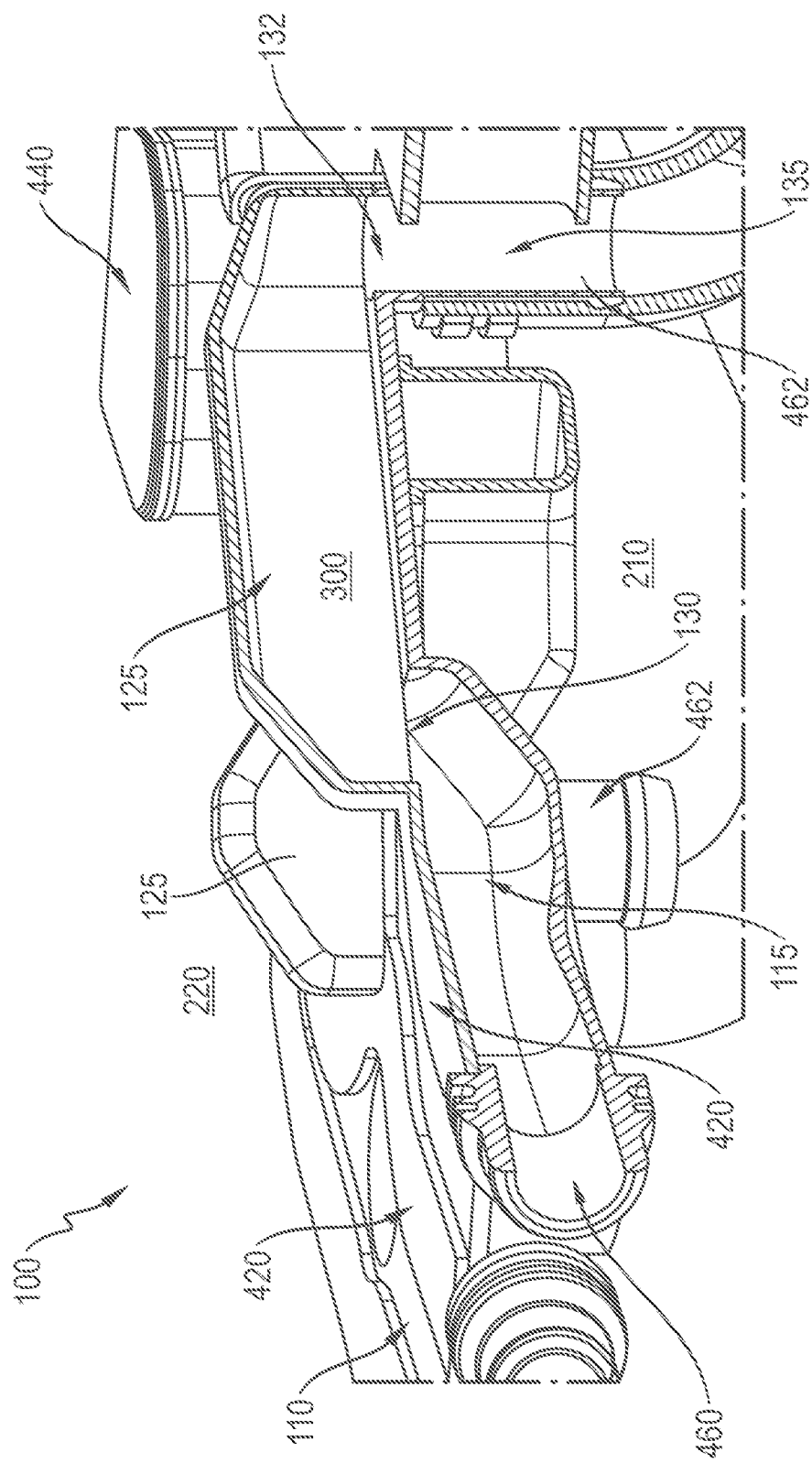
FIG. 18 a sectional view of an apparatus according to the invention.

FIG. 18 shows a sectional view of an apparatus 100 according to the invention. The fluid flow channel sections 115 already described in FIG. 17 and the further flow channels 410, which are mostly located in the first subspace 210 and are designed to be open towards the second subspace 220, are configured to be closed by means of closure elements 420 or by means of a second fluid flow channel section 125.

The sectional view shows a fluid flow channel 300 starting at a fluid port 460. The fluid port 460 merges into the first fluid flow channel section 115. The first fluid flow channel section 115 is located in the first subspace 210, i.e., here below the base plane 110, and is closed from the side of the second subspace 220 by a closure element 420. The first fluid flow channel section 115 is fluidly connected to a second fluid flow channel section 125 via a first through-flow opening 130. The through-flow opening 130 is located in the base plane and thus allows flowing fluid to flow into the second subspace 220.

The second fluid flow channel section 125 is disposed in the second subspace 220 and fluidly connected to a third fluid flow channel section 135, which in turn is disposed in the first subspace 210. Fluid thus flows through the second fluid flow channel section 125 and passes through a second through-flow opening 132 to enter the third fluid flow channel section 135. The second through-flow opening 132 is also located in the base plane 110, thus allowing flowing fluid to flow back into the first subspace 210.

The transitions of the first fluid flow channel section 115 into the second fluid flow channel section 125, as well as of the second fluid flow channel section 125 into the third fluid flow channel section 135, each have a flow-optimized design. In this case, the fluid flow cross-section at the transitions corresponds at least to the fluid flow cross-section of the fluid port 460. In addition, the transitions comprise a beveled end piece, whereby a turbulence-free inflow from a fluid flow channel section into a subsequent fluid flow channel section or into the nozzle 462 of a coolant port can take place. The flow optimization reduces pressure differentials and improves the operation of the apparatus 100. The third fluid flow channel section 135 is formed facing away from the base element 110 and merges with the nozzle 462. The first fluid flow channel section 115, the second fluid flow channel section 125, and the third fluid flow channel section 135 together form a complete flow channel 300.

Figure 19:
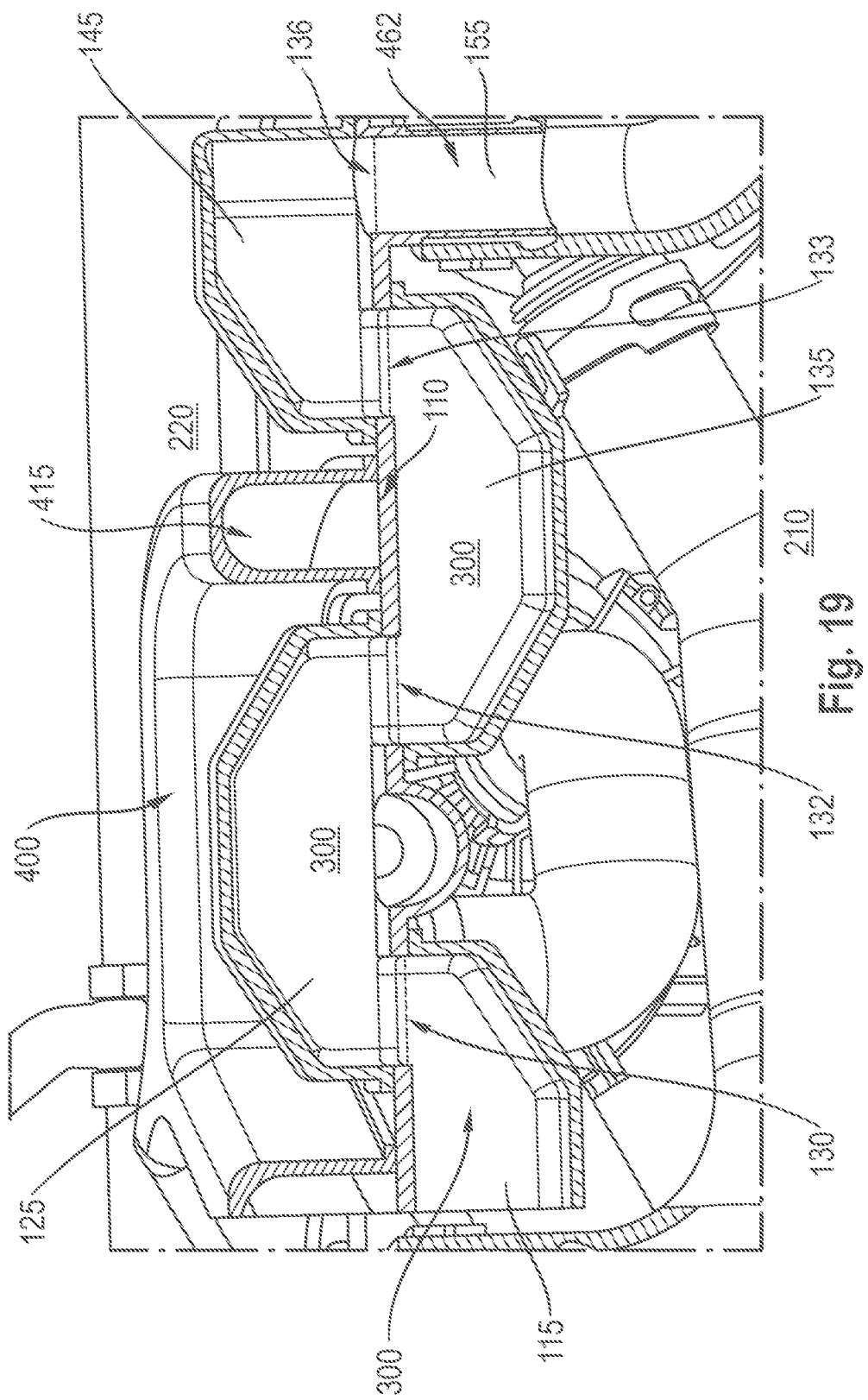
FIG. 19 a further sectional view of an apparatus according to the invention.

FIG. 19 shows a further sectional view of an apparatus 100 according to the invention. The sectional view shows a flow channel 300 with a first fluid flow channel section 115 in the first subspace 210, i.e. here below the base element 110. The first fluid flow channel section 115 is fluidly connected to a second fluid flow channel section 125 in the second subspace 220 via a first through-flow opening 130, which is located in the base plane. The second fluid flow channel section 125 is disposed entirely within the second subspace 220. Continuing, the second fluid flow channel section 125 is fluidly connected to a third fluid flow channel section 135 in the first subspace 210 via a second through-flow opening 132, which is again located in the base plane. The third fluid flow channel section 135 is disposed entirely within the first subspace 210.

FIG. 19 shows a further sectional view of an apparatus 100 according to the invention. The sectional view shows a flow channel 300 with a first fluid flow channel section 115 in the first subspace 210, i.e. here below the base element 110. The first fluid flow channel section 115 is fluidly connected to a second fluid flow channel section 125 in the second subspace 220 via a first through-flow opening 130, which is located in the base plane. The second fluid flow channel section 125 is disposed entirely within the second subspace 220. Continuing, the second fluid flow channel section 125 is fluidly connected to a third fluid flow channel section 135 in the first subspace 210 via a second through-flow opening 132, which is again located in the base plane. The third fluid flow channel section 135 is disposed entirely within the first subspace 210.

Further, the third fluid flow channel section 135 is fluidly connected to a fourth fluid flow channel section 145 in the second subspace 220 via a third through-flow opening 133, which is again located in the base plane. The third fluid flow channel section 135 is disposed entirely in the first subspace 210, and the fourth fluid flow channel section 145 is disposed entirely in the second subspace 220. Subsequently, the fourth fluid flow channel section 145 is transferred to the fifth fluid flow channel section 155 in the first subspace 210 via the fourth through-flow opening 136, which is also located in the base plane. The fifth fluid flow channel section 155 is formed facing away from the base element 110, and merges with the nozzle 462.

Fluid thus flows through the flow channel 300 beginning in the first fluid flow channel section 115 below the base plane 110, flows through the first through-flow opening 130 into the second fluid flow channel section 125 in the second subspace 220, and flows through the second through-flow opening 132 into the third fluid flow channel section 135 in the first subspace 210. From the third fluid flow channel section 135 in the first subspace 210, fluid flows through the third through-flow opening 133 into the fourth fluid flow channel section 145 in the second subspace 220 and then flows through the fourth through-flow opening 136 into the fifth fluid flow channel section 155 in the first subspace 210, which comprises the nozzle 462. In other words, the fluid repeatedly alternates between the first subspace 210 and the second subspace 220.

Additionally, FIG. 19 shows a second flow channel 400 with a fourth fluid flow channel section 415. The second flow channel 400 and the fourth fluid flow channel section 415 are arranged in the second subspace 220, i.e., here above the base element 110. The second flow channel 400 and the first flow channel 300 intersect.

Here, fluid in the first flow channel 300 flows through the second fluid flow channel section 125 and then through the base element 110 from the second subspace 220 into the first subspace 210 through the second through-flow opening 132 into the third fluid flow channel section 135 and then through the third through-flow opening 133 back into the second subspace 220. In contrast, the second flow channel 400 having a fourth fluid flow channel section 415 flows continuously in the first subspace 220 and crosses the first flow channel 300 between the second through-flow opening 132 and the third through-flow opening 133. Thus, the base element 110 serves as a separation wall between the second flow channel 400 and the first flow channel 300.

FIG. 20 shows a still further sectional view of an apparatus 100 according to the invention. FIG. 20 shows a fluid handling element 440, which is inserted into a receptacle 430 of the base element 110. The fluid handling element 440 includes a valve body 16, which is rotatably disposed within the receptacle 430, and an electric motor 4 disposed within an actuator housing 5. The valve body 16 is interposed with sealing means 464 between the flow openings 432, 434 and can interconnect the two further flow channels 410 depending on the switching position.

The entire fluid handling element 440 including the valve body 16 is inserted into the receptacle 430 from the second subspace 220. Here, the valve body 16 is located below the base element 110, i.e., in the first subspace 210.

Above the valve body 16 is a valve body cover 466, which is arranged in the base plane and welded—for example laser welded—to the base element 110. The two further flow channels 410 are each closed by means of a closure element 420, which is also arranged in the base plane and welded to the base element 110.

All of the features explained and shown in connection with individual embodiments of the invention may be provided in different combinations in the subject matter of the invention in order to simultaneously realize their advantageous effects. The scope of protection of the present invention is given by the claims and is not limited by the features explained in the description or shown in the figures.

We claim:

1. An apparatus for handling fluid of an at least partially electrically powered vehicle, comprising:
   a substantially plate-shaped base element defining a base plane, the base plane separating a first subspace from a second subspace; and
   at least a first fluid flow channel section located mostly in the first subspace, and at least a second fluid flow channel section located mostly in the second subspace, and
   wherein the base element comprises at least a first flow-through opening fluidly connecting the first fluid flow channel section with the second fluid flow channel section, and
   at least one further flow channel arranged mostly in either the first subspace or the second subspace,
   wherein the at least one further flow channel is formed closable by means of a closure element, wherein the closure element is arranged substantially parallel to the base element and a glass fiber portion of the base element is greater than a glass fiber portion of the closure element.

2. The apparatus according to claim 1, further comprising a third fluid flow channel section located mostly within the first subspace, wherein the base element comprises a second through-flow opening fluidly connecting the second fluid flow channel section to the third fluid flow channel section.

3. The apparatus according to claim 1, further comprising a third fluid flow channel section disposed exclusively in the first subspace and allowing fluid flow away from the base element.

4. The apparatus according to claim 1, wherein a first fluid flow channel is formed by the first fluid flow channel section, the second fluid flow channel section, and the third fluid flow channel section.

5. The apparatus according to claim 4, with a second fluid flow channel comprising at least a fourth fluid flow channel section disposed between the first through-flow opening and the second through-flow opening and mostly in the first subspace, wherein the first fluid flow channel and the second fluid flow channel intersect.

6. The apparatus according to claim 1, wherein the base element comprises at least one receptacle for a fluid handling element.

7. The apparatus according to claim 6, wherein the receptacle comprises at least a first flow port and a second flow port each connecting one of said flow channels to another of said flow channels.

8. The apparatus according to claim 1, wherein the base element comprises at least one bearing element configured to arrange the apparatus to the body of a vehicle.

9. The apparatus according to claim 1, wherein the base element comprises at least one fluid port configured such that fluid flows into the apparatus.

10. The apparatus according to claim 1, wherein the base element, including the first fluid flow channel section and the third fluid flow channel section, is formed, as a one-piece integral component, by injection molding.

11. The apparatus according to claim 1, wherein the second fluid flow channel section is arranged to the base element in the second subspace.

12. The apparatus according to claim 1, wherein the plate-shaped base element comprises a material thickness between 1 mm and 10 mm, between 2 mm and 5 mm, or between 2.5 mm and 3.5 mm.

13. The apparatus according to any claim 1, wherein the closure element comprises a material thickness between 0.5 mm and 3 mm, or between 1 mm and 2 mm.

* * * * *